United States Patent [19]

Ikeya

[11] Patent Number: 5,109,376
[45] Date of Patent: Apr. 28, 1992

[54] OPTICAL AXIS MONITORING DEVICE

[75] Inventor: Tomoyoshi Ikeya, Yamanashi, Japan

[73] Assignees: Pioneer Electronic Corporation, Tokyo; Pioneer Video Corporation, Yamanashi, both of Japan

[21] Appl. No.: 349,209

[22] Filed: May 9, 1989

[30] Foreign Application Priority Data

Oct. 27, 1988 [JP] Japan ................... 63-271541

[51] Int. Cl.$^5$ ................................ G11B 7/00
[52] U.S. Cl. .................... 369/116; 369/112; 369/111; 369/54
[58] Field of Search ............... 369/44.14, 44.34, 38, 369/111, 112, 54, 44.13, 116; 358/298, 296; 365/124

[56] References Cited

U.S. PATENT DOCUMENTS

| 2,807,799 | 9/1957 | Rosenthal | 365/124 |
| 3,611,405 | 10/1971 | Chang et al. | 346/1 |
| 4,454,415 | 6/1984 | Nayak et al. | 369/44.14 |
| 4,462,095 | 7/1984 | Chen | 369/44.14 |
| 4,466,088 | 8/1984 | Trethewey | 369/44.14 |
| 4,467,467 | 8/1984 | Wilkinson et al. | 369/111 |
| 4,571,712 | 2/1986 | Romano et al. | 369/44.34 |
| 4,627,725 | 12/1986 | Nishio et al. | 369/112 |

FOREIGN PATENT DOCUMENTS 2841316 9/1978 Fed. Rep. of Germany .
3434586 9/1984 Fed. Rep. of Germany .
3546012 12/1985 Fed. Rep. of Germany .

Primary Examiner—Roy N. Envall, Jr.
Assistant Examiner—Nabil Hindi
Attorney, Agent, or Firm—Finnegan, Henderson, Farabow, Garrett and Dunner

[57] ABSTRACT

An optical axis monitoring apparatus for monitoring a variation in the optical axis of light beams in an optical system. The apparatus includes a light source for generating a light beam to propagate along a first optical path. A diffraction optical element is disposed along the first optical path for diffracting the light beam into at least two orders of diffraction. At least one of the orders of diffraction propagates along the first optical path and another of the orders of diffraction propagates along a second optical path. A first monitoring element id disposed along the first optical path between the light source and the diffraction optical element for monitoring the first light beam and generating an incoming beam signal in response to light incident thereon. The incoming beam signal being indicative of the condition of the first light beam. A second monitoring element is disposed opposite the diffraction optical element from the first monitoring element and along said the second optical path. The second monitoring element is for receiving light diffracted into the other of the orders of diffraction by the diffraction means and generating an outgoing beam signal in response to light incident thereon. The outgoing beam signal is indicative of the condition of the light beam emanating from the diffraction optical element.

6 Claims, 3 Drawing Sheets

RAMAN DIFFRACTION

BRAGG DIFFRACTION

OPTICAL AXIS MONITORING DEVICE

BACKGROUND OF THE INVENTION

1. Field of the Invention

The present invention relates to an optical axis monitoring device and, more particularly, to an optical axis monitoring device for monitoring optical axis variations of light beams in an optical device.

2. Background Technology

The prior art is evidenced by Japanese Utility Model Application No. 57795/83 (Japanese Utility Model Laid Open No. 163943/84) which discloses a device in which a light-receiving element for an optical axis monitoring system is provided in the path of a light beam from a light source. Information on the optical axis variation is obtained from the output of a light-receiving element.

FIG. 4 is a schematic diagram of such a prior art device applied to an optical system of an optical information recording apparatus. Laser beams 2 from a laser beam source 1 are reflected by a mirror 11 and are made to be incident upon a first beam splitter 3-1. The beams are split into a main beam 2a and a sub-beam 2b-1 by the beam splitter 3-1. The sub-beam 2b-1 falls incident on the light-receiving surface of a first light-receiving element 4-1. The main beam 2a is modulated by an electrical signal (not shown) which contains information to be recorded in an optoelectronic modulator 12 and falls incident on a second beam splitter 3-2. In the beam splitter 3-2 the beam is split again into a main beam 2a and a sub-beam 2b-2, and the second sub-beam 2b-2 falls incident on a second light-receiving element 4-2.

The main beam 2a falls incident upon a polarizing beam splitter 14 via a diverging lens 13. The main beam which falls incident upon the polarizing beam splitter 14 propagates straight through the beam splitter 14 to a quarter wavelength plate 15. The beam which passes through the quarter wavelength plate 15 is projected by an objective lens 16 to the recording surface of a recording disk 20.

The light reflected from the recording surface of the recording disk 20 propagates back through objective lens 16 and quarter wavelength plate 15 and falls incident on the polarizing beam splitter 14. The light reflected by the recording surface of the recording disk 20 is redirected at an angle of 90° by the polarizing beam splitter and falls incident on a light-receiving element 18 via a cylindrical lens 17. The amount of displacement of the objective lens 16 in a direction perpendicular to the disk 20 is controlled by the output of the light-receiving element 18. Thus, a focus servo loop is provided to ensure that the recording beams are always focused on the recording surface of the recording disk 20 to obviate misfocusing due to surface warping of the disk 20 or the like.

In an apparatus as set forth in the above in reference to FIG. 4, when a variation in the optical axis of the laser beam source 1 occurs or the laser beam source 1 is replaced, for example, it is possible to bring the main beam 2a into alignment with the normal optical axis by means of the respective outputs of the two light receiving elements 4-1 and 4-2. In such a case, adjustment of the optical axis can be accomplished by a mere adjustment of the mirror 11 or the light source 1 without requiring adjustment of each component of the optical device 30.

The beam splitters 3-1 and 3-2, mentioned above, consists of a polarizing beam splitter or a prism obtained by bonding half prisms together. When a beam splitter of such a construction is used in a signal recording system, the power of light beams that pass through it reaches as high as about 150 mW. Under such circumstances, damage to the polarizing beam splitter is possible due to degradation of the adhesive applied on the contact faces of the two half prisms when they are bonded together.

Accordingly, it is desirable to form the beam splitter with a flat half mirror to split light beams into two parts, and supply one of the two to the monitoring light-receiving element. However, light beams that pass through a flat half mirror undergo an aberration and a shift of optical axis which results in the distortion in the form of a light spot formed on the master disk. This distortion of the light spot causes a problem in that the formation of pits on the master disk is affected.

SUMMARY OF THE INVENTION

It is, therefore, an object of the present invention to provide an optical axis monitoring device that makes it possible to obtain a sub-beam for the monitoring element without affecting the main beam.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention as embodied and broadly described herein, the optical axis monitoring device of the present invention is a device for monitoring a variation in the optical axis of light beams in an optical apparatus comprising an acousto-optical modulator provided in the optical path of the light beams and a monitoring element for receiving light that is diffracted at least once by the acousto-optical modulator. Information on the optical axis variation of the light beams can be obtained from the output of the monitoring element.

BRIEF DESCRIPTION OF THE DRAWINGS

The accompanying drawings, which are incorporated in and constitute a part of the specification, illustrate one embodiment of the invention and, together with the description, serve to explain the principles of the invention.

DESCRIPTION OF THE PREFERRED EMBODIMENTS

Figure 1:
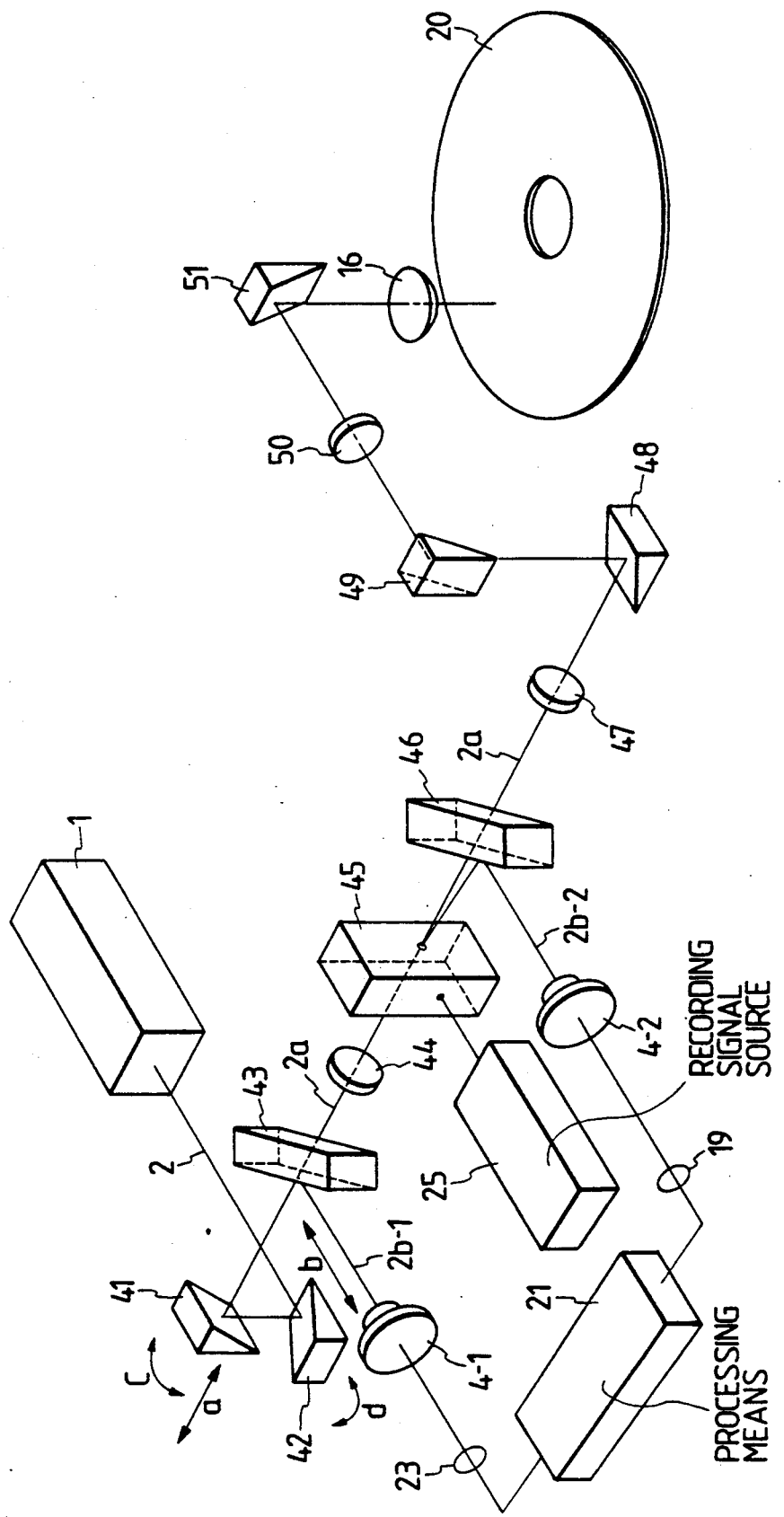
FIG. 1 is a schematic block diagram of an optical system in accordance with the present invention.

Referring to FIG. 1, an embodiment of the present invention will be described as follows. Light beams 2 emanating from a laser beam source 1 are reflected by position adjusting mirrors 41 and 42 and fall incident on a beam splitter 43. A sub-beam 2b-1 split by the beam splitter 43 falls incident on the light-receiving surface of a monitoring light-receiving element 4-1. A main beam 2a passes through the beam splitter 43 and is converged by lens 44 to a desired beam diameter and then falls incident on an acousto-optical modulator 45 where it is modulated by a recording signal supplied from a recording signal source 25.

Figure 3A:
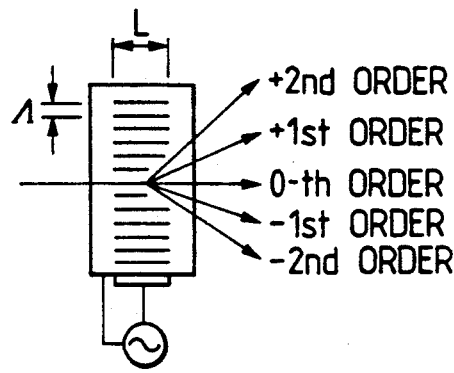
FIG. 3(a) is a schematic diagram of an acousto-optical modulator in accordance with the present invention.
Figure 3B:
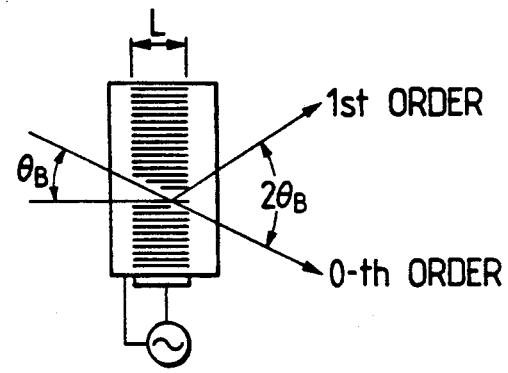
FIG. 3(b) is a schematic diagram of an acousto-optical modulator in accordance with the present invention.
Figure 4:
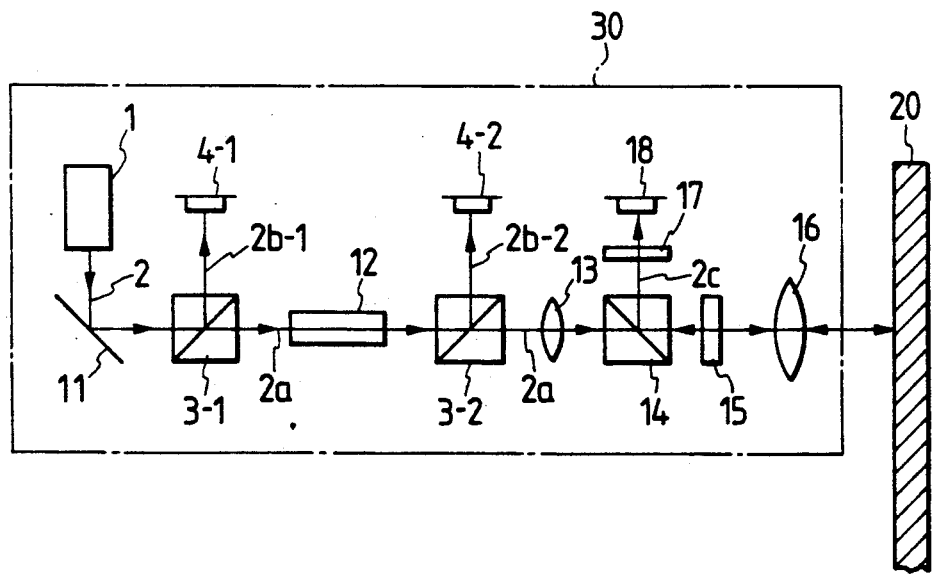
FIG. 4 is a block diagram of an optical system in accordance with the prior art.

The acousto-optical modulator 45 is a device that makes use of the so-called acousto-optical effect, a phenomenon in which the index of refraction of a medium is varied in accordance with it is distortion due to the acoustic wave. Since the velocity of propagation of an acoustic wave is sufficiently small compared with the velocity of light, the periodic change in the index of refraction of the medium is equivalent to stationary phase gratings. Diffraction of light by phase gratings can roughly be divided into Raman diffraction and Bragg diffraction depending upon the ratio of the bonding length L to the wavelength G of the ultrasonic wave, as shown in FIGS. 3(a) and 3(b). Preferably, use will be made of Bragg diffraction in a device in accordance with the present invention because Bragg diffraction has a more efficient use of light.

In Bragg diffraction, when the angle of incidence sin $r_b$ satisfies the following equation, light beams diffracted by each acoustic wave front add up to give rise to a maximum intensity of diffracted beams in a direction that makes an angle of $2 \cdot r_b$ with respect to the incident beams.

$$\sin r_b = \frac{g}{2G} = \frac{g}{2} \cdot \frac{f_S}{V_S},$$

where:
$r_b$ = the Bragg angle,
g = the wavelength of the light,
G = the wavelength of the ultrasonic wave,
$f_S$ = the frequency of the ultrasonic wave, and
$V_S$ = the velocity of sound in the medium.

In other words, in Bragg diffraction, the angles formed between the incident beams and the diffracted beams, with the wave front of the ultrasonic wave, are both equal to the Bragg angle $r_b$.

As a result, a zero-th order beam and a first order beam modulated by the recording signal from the recording signal source 25 are outputted from the acousto-optical modulator 45.

One of the light beams thus split is used for the light-receiving element for monitoring 4-2. For example, the first order beam with large extinction ratio may be used as the main beam 2a while the zero-th order beam may be used as the sub-beam 2b-2. The sub-beam 2b-2 falls incident on the light-receiving element for monitoring 4-2 after being reflected by the beam splitter 46. The reflectance R of the beam splitter 46 may be set within the range of $0 < R \leq 100\%$ by taking the ability of the light-receiving element for monitoring 4-2 to withstand light into consideration. This adjustment of reflectance R can be accomplished by employing, for example, a half mirror as the beam splitter 46 and selecting a half mirror that has the desired degree of reflectance.

The beam splitter 46 is mounted and oriented so that the beam splitter 46 reflects the zero-th order beam (sub-beam 2b-2) and does not intercept the first order beam (main beam 2a).

The main beam 2a that passed above the beam splitter 46 is converged by a lens 47 to have a desired beam diameter, and is directed onto the recording surface of the disk 20 via mirrors 48, 49 and 51. The spot diameter of the light beam is adjusted by a halfway lens 50.

Figure 2:
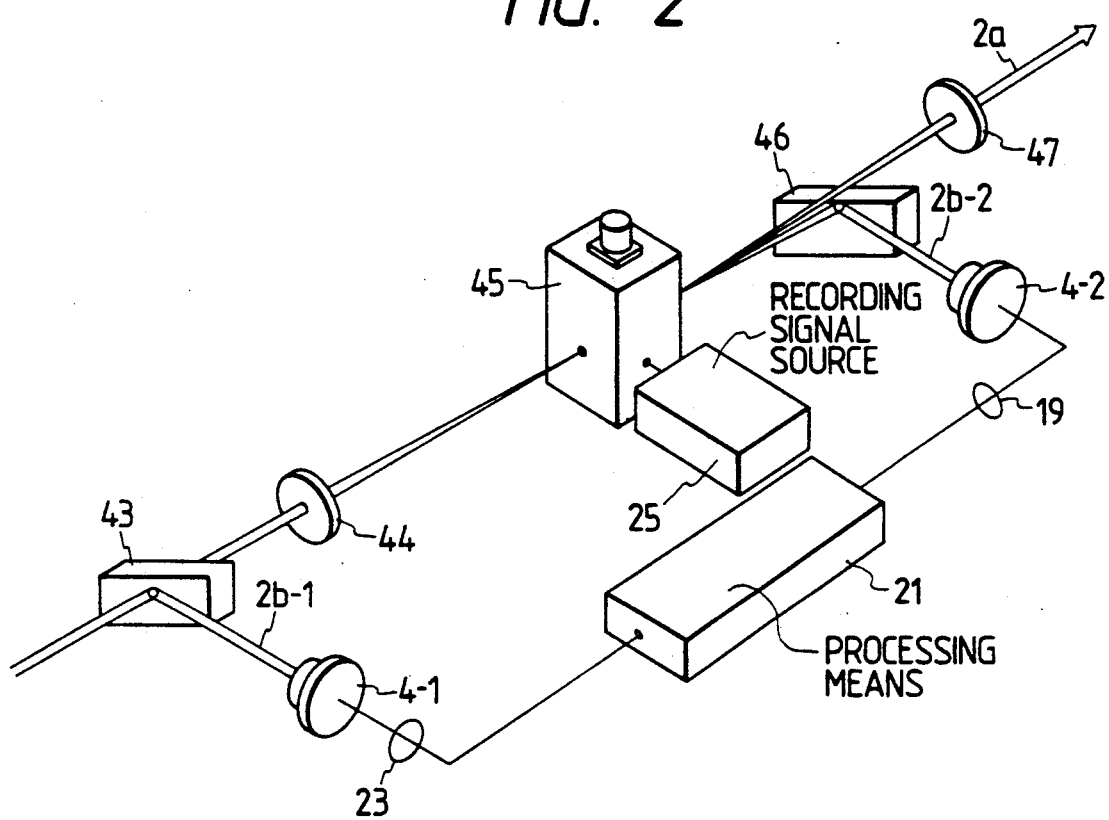
FIG. 2 is a schematic block diagram of an optical system showing incident beams and the outgoing beams of an acousto-optical modulator in accordance with the present invention.

FIG. 2 is a diagram, as seen from a direction which is different from that of FIG. 1, of the above example in which the zero-th order beam emanating from the acousto-optical modulator 45 is directed by the mirror 46 to the light-receiving surface of the light-receiving element for monitoring 4-2. Here, if desired, an arrangement may also be made to lead the first order beam or the n-th order beam to the light-receiving surface of the light-receiving element for monitoring 4-2 by means of the mirror 46.

The beam splitter 46 is provided between the acousto-optical modulator 45 and the lens 47 in the above embodiment. However, it is not limited to place the beam splitter 46 in such a position, the beam splitter 46 may be placed somewhere in the optical path after the acousto-optical modulator 45.

The element 4-1 (two dimensional position sensor) provided closer to the laser beam source 1 detects the discrepancy of parallel component of the optical axis from the reference position, and the optical axis is adjusted by parallel moving the position adjusting mirrors 41 and 42 in the directions indicated by arrows and b respectively, in response to the output from the element 4-1. On the other hand, the element 4-2 (two dimensional position sensor) provided further from the laser beam source 1 detects the discrepancy of angular component of the optical axis from the reference angle, and the optical axis is adjusted by turning the position adjusting mirrors 41 and 42 in the directions indicated by arrows c and d respectively, in response to the output from the element 4-2.

In this manner, the position adjusting mirrors 41 and 42 are constructed as capable of parallel moving and turning (not shown). Further, the mirrors 41 and 42 can be adjusted manually or automatically in response to the outputs from the elements 4-1 and 4-2.

As shown in FIGS. 1 and 2 the output signals from light-receiving elements for monitoring 4-1 and 4-2 passes along lines 23 and 19, respectively, to processing means 21. Processing means 21 processes signals generated by light receiving elements for monitoring 4-1 and 4-2 to determine optical axis variation of main beam 2a and provides information indicative of the variation so that variable mirrors 41 and 42 or the laser beam source 1 may be moved to correct the variation.

As described in the foregoing, in the optical axis monitoring device of the present invention, a diffracted beam (such as the beam resulting from first order diffraction) a non-diffracted beam (or zero-th order diffraction) coming out of the acousto-optical modulator is directed by mirrors to the light-receiving element, and another of the outgoing beams is used as the main beam. Therefore, the present device is preferable in the sense that problems such as aberration and optical axis shift associated with a transmission type beam splitter such as half mirror are not realized.

It will be apparent to those skilled in the art that various modifications and variations can be made in the optical axis monitoring device of the present invention without departing from the scope or spirit of the invention. Thus, it is intended that the present invention cover the modifications and variations of this invention provided they come within the scope of the appended claims and their equivalents.

What is claimed is:

1. An optical axis monitoring apparatus for monitoring a variation in optical axis of a light beam in an optical recording system, comprising:
   a light source for emitting said light beam;
   a first optical system for projecting and positioning said light beam;
   first monitoring means for monitoring a first variation in optical axis of the light beam and producing a monitored light beam;
   an acousto-optical modulator, on which the monitored light beam is incident, for producing a zero-th order beam and a diffracted beam modulated by a recording signal;
   second monitoring means for receiving the zero-th order beam to monitor a second variation in optical axis, said second monitoring means including reflecting means for reflecting the zero-th order beam, said reflecting means being placed so as not to intercept the diffracted beam, and a first light-receiving element for monitoring said reflected zero-th order beam, said first light-receiving element being a two-dimensional position monitoring sensor; and
   a second optical system for projecting said diffracted beam on a recording medium for recording.

2. The optical axis monitoring apparatus according to claim 1, wherein said first monitoring means includes a beam splitter and a second light-receiving element, said beam splitter for splitting said light beam into the monitored beam and a second beam, said second light-receiving element for receiving the second beam to monitor a second variation in optical axis, said second light-receiving element being a two-dimensional position monitoring sensor.

3. The optical axis monitoring apparatus according to claim 2, wherein said monitoring means includes processing means for processing signals generated by each of said first and second light-receiving means.

4. The optical axis monitoring apparatus according to claim 1, wherein said first optical system includes a first mirror and a second mirror, said first and second mirror being movable in a plurality of directions, said plurality of directions including an angular component and a parallel component.

5. The optical axis monitoring apparatus according to claim 1, wherein said second optical system includes a first mirror, a second mirror and a third mirror for projecting said diffracted beam on said recording medium.

6. The optical axis monitoring apparatus according to claim 1, further comprising a first converging lens and a second converging lens, said first converging lens being positioned between said beam splitter and said acousto-optic modulator, and said second converging lens being positioned between said reflecting means and said second optical means.

* * * * *